(12) United States Patent
Nakanishi et al.

(10) Patent No.: US 6,723,472 B2
(45) Date of Patent: Apr. 20, 2004

(54) LITHIUM SECONDARY BATTERY

(75) Inventors: Shinji Nakanishi, Hirakata (JP); Kazuya Iwamoto, Sakai (JP); Hiroyuki Murai, Hirakata (JP); Kiyomi Kato, Moriguchi (JP); Yukishige Inaba, Higashiosaka (JP); Shoichiro Watanabe, Ikoma-gun (JP); Hizuru Koshina, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 249 days.

(21) Appl. No.: 09/889,170

(22) PCT Filed: Nov. 30, 2000

(86) PCT No.: PCT/JP00/08470
§ 371 (c)(1),
(2), (4) Date: Jul. 11, 2001

(87) PCT Pub. No.: WO01/41249
PCT Pub. Date: Jun. 7, 2001

(65) Prior Publication Data
US 2003/0077517 A1 Apr. 24, 2003

(30) Foreign Application Priority Data
Dec. 1, 1999 (JP) .............................. 11-341751
Nov. 28, 2000 (JP) ........................... 2000-360633

(51) Int. Cl.$^7$ .............................................. H01M 10/40
(52) U.S. Cl. ....................... 429/324; 429/337; 429/338; 429/343

(58) Field of Search .................................. 429/324, 337, 429/338, 343

(56) References Cited

FOREIGN PATENT DOCUMENTS

| EP | 0886334 A1 | 12/1998 |
|---|---|---|
| JP | 4319259 | 11/1992 |
| JP | 4319260 | 11/1992 |
| JP | 5006779 | 1/1993 |
| JP | 5006780 | 1/1993 |
| JP | 6150928 | 5/1994 |
| JP | 7192721 | 7/1995 |
| JP | 8064237 | 3/1996 |
| JP | 8335465 | 12/1996 |
| JP | 9330719 | 12/1997 |
| JP | 10189045 | 7/1998 |

OTHER PUBLICATIONS

JPO Web Site translation of JP–07–192721–A.*
International Search Report dated Jun. 3, 2001.

* cited by examiner

Primary Examiner—Gregg Cantelmo
(74) Attorney, Agent, or Firm—Stevens, Davis, Miller & Mosher, LLP.

(57) ABSTRACT

Lithium batteries having excellent high rate characteristics and low-temperature characteristics, and less in evolution of gases and superior in discharge characteristics are provided by using $LiCoO_2$ mixed with CaO or $Cr_2O_3$ or the like as an active material of positive electrode in combination with a non-aqueous electrolyte containing a mixed electrolyte salt comprising both a fluorine-containing inorganic anion lithium salt and a lithium imide salt.

10 Claims, 1 Drawing Sheet

LITHIUM SECONDARY BATTERY

TECHNICAL FIELD

The present invention relates to a lithium secondary battery.

BACKGROUND ART

A lithium secondary battery is mainly composed of a positive electrode, a negative electrode, a non-aqueous electrolyte and a separator separating the positive electrode and the negative electrode from each other. The non-aqueous electrolyte is obtained by dissolving an electrolyte salt comprising an alkali metal salt such as $LiPF_6$ in a non-aqueous solvent such as ethylene carbonate or dimethyl carbonate. The separator is insoluble in the above non-aqueous solvent, and is a porous film made of, for example, polyethylene or polypropylene resin.

A lithium secondary battery is a secondary battery having high energy density and capable of being miniaturized for weight-saving, and for attaining further higher performance, intensive investigation is now being made on the constitutive elements of the above battery.

For example, recently, lithium-containing transition metal oxides such as lithium cobaltate ($LiCoO_2$) which show a high potential are used as active materials of positive electrodes, and carbon materials such as graphite are often used as negative electrode materials.

JP-A-4-319259, JP-A-4-319260, JP-A-5-6779, JP-A-5-6780 and JP-A-6-150928 disclose techniques according to which 1–10 mol % of lanthanum, zirconium, cobalt, yttrium or samarium based on cobalt of the active material of positive electrode is added and fired to cover the active material of positive electrode with an oxide of cobalt and the element added (for example, $LaCoO_3$ in the case of using lanthanum), whereby the active material of positive electrode is stabilized to inhibit the decomposition of the electrolyte and improve the storage characteristics. Furthermore, JP-A-7-192721 discloses a technique according to which 0.1–20 mol % of a metal selected from the group of sodium, magnesium, aluminum, potassium, calcium and the like is added to the active material of positive electrode and is allowed to act as a catalyst poison for the decomposition reaction of the electrolyte, thereby to inhibit the decomposition of the electrolyte and improve the storage characteristics.

DISCLOSURE OF INVENTION

The inventors have made further various investigations in an attempt to provide batteries excellent in high rate characteristics and low-temperature characteristics. As one of the methods, it has been found that excellent characteristics can be obtained by adding to the active material of positive electrode a small amount of different elements of Groups IIA, IIIB, IVB, VB and VIB and lanthanide elements in the periodic table. It is considered that this is because addition of the above elements causes change in the surface state of the active material to increase the surface area. However, it has been seen that although the above characteristics are improved, amount of the gas evolved during storage at high temperatures increases. The cause therefor seems that the added elements together with the active material form an active site for evolution of gas on the positive electrode to cause decomposition of the electrolyte.

The above decomposition of the electrolyte is mainly due to the oxidative decomposition of the solvent on the positive electrode. Especially, when a cyclic carbonic acid ester or a cyclic carboxylic acid ester is used as a solvent, a ring opening reaction is apt to take place, and the ring opening reaction product readily undergoes oxidative decomposition on the positive electrode. Furthermore, when a non-cyclic carbonic acid ester is used as a solvent, an ester interchange reaction takes place. An intermediate product of this ester interchange reaction also readily undergoes oxidative decomposition on the positive electrode. These oxidative decomposition reactions involve evolution of gases such as carbon dioxide to result in reduction of battery voltage and deterioration of battery characteristics after storing of battery.

The inventors have conducted further research, and, as a result, have found that batteries excellent in storage characteristics at high temperatures as well as high rate characteristics and low-temperature characteristics can be provided by using an electrolyte having a specific composition in combination with the above-mentioned active material of positive electrode. Thus, the present invention has been accomplished.

That is, the present invention relates to a lithium secondary battery comprising a positive electrode having as an active material a lithium-containing composite transition metal oxide or a lithium-containing composite transition metal oxide in which a metal element other than the transition metal constituting the lithium-containing composite transition metal oxide is contained in the form of solid solution, the positive electrode further comprises one or more of metals of Groups IIA, IIIB, IVB, VB and VIB and lanthanide elements in the periodic table and compounds of these metals; a negative electrode; and a non-aqueous electrolyte containing a solvent and an electrolyte salt containing at least one member selected from the group of fluorine-containing inorganic anion lithium salts comprising $LiPF_6$, $LiBF_4$, $LiAsF_6$ and $LiSbF_6$ and at least one member selected from lithium imide salts represented by the following formula (1):

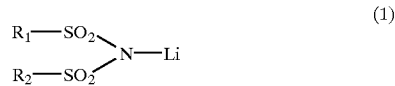

(1)

(wherein $R_1$ and $R_2$ are independent of one another and represent $C_nX_{2n+1}$ or $C_nX_{2n-1}$ in which n is an integer of from 1 to 8 and X is a hydrogen atom or a halogen atom).

The inventors consider that it is based on the following principle that evolution of gases can be inhibited by using an electrolyte containing the lithium imide salt.

A lithium imide salt such as $LiN(CF_3SO_2)_2$ undergoes oxidative decomposition at a lower potential as compared with $LiPF_6$. When a cyclic voltammetry is conducted using a platinum electrode as a working electrode, and lithium metal as a reference electrode and a counter electrode at room temperature, a current produced by the oxidative decomposition begins to flow at about 4.2 V (Li standard). In the case of usual lithium secondary batteries, since potential of the positive electrode reaches higher than 4.2 V at the time of full charging, the lithium imide salt added to the electrolyte is decomposed at the initial charging. At that time, the decomposition product covers the surface of the positive electrode to cover the active points which participate in the reaction of the electrolyte. As a result, evolution of gases at the time of charging can be inhibited. Moreover, the above decomposition product also covers the surface of the negative electrode and thus simultaneously inhibits the evolution of gases at the surface of the negative electrode. It further inhibits decomposition of the additives in the positive electrode and dissolution of them into the electrolyte.

The above storage characteristics depend on the amount of the lithium imide salt added, and as a result of intensive investigation conducted by the inventors, it has been found that the amount is suitably not less than 0.003 mol/l and not more than 0.50 mol/l. If the lithium imide salt is added in an amount of more than 0.50 mol/l, the quantity of electricity required for decomposition increases to cause increase of charging loss. If the lithium imide salt is added in an amount of less than 0.003 mol/l, the amount of the decomposition product of the imide salt is insufficient, and, hence, evolution of gases during storage at high temperatures cannot be sufficiently inhibited. The amount is more preferably not less than 0.003 mol/l and not more than 0.25 mol/l, most preferably not less than 0.003 mol/l and not more than 0.05 mol/l.

The technique of using a fluorine-containing inorganic anion lithium salt and a lithium imide salt in admixture is disclosed, for example, in JP-A-10-189045. On the other hand, the present invention has been made to solve the problem peculiar when one or more of metals of Groups IIA, IIIB, IVB, VB and VIB and lanthanide elements in the periodic table and compounds of these metals is added to the positive electrode, and the optimum amount of the imide salt in this case has been found.

By using the above-mentioned mixed electrolyte salts, a lithium secondary battery less in evolution of gases during storage at high temperatures and superior in reliability can be provided.

BEST MODE FOR CARRYING OUT THE INVENTION

Figure 1:
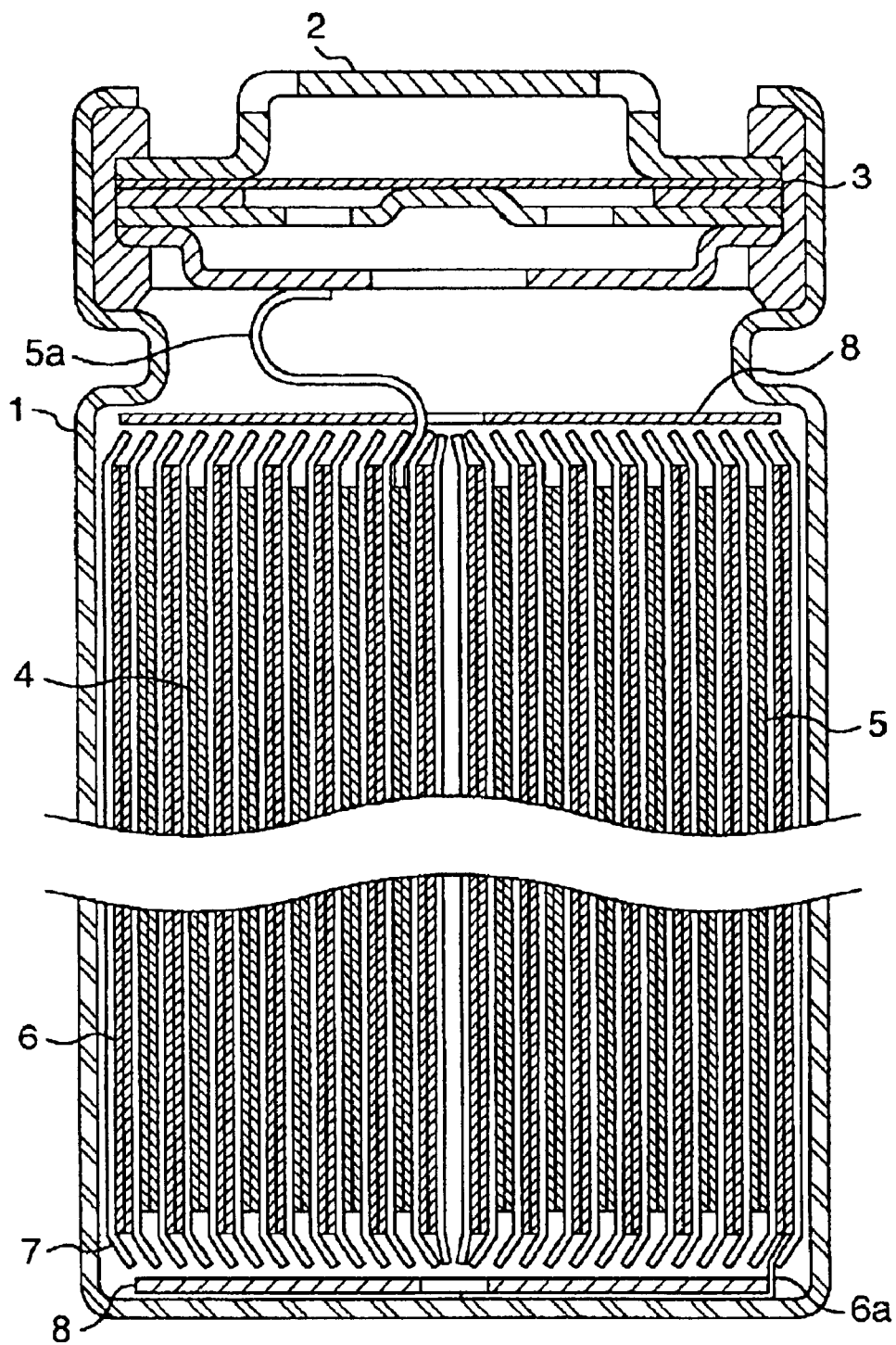
FIG. 1 is a longitudinal sectional view of a lithium secondary battery in the example of the present invention.

The mode for carrying out the present invention will be explained below.

The electrolyte for the non-aqueous electrolyte battery of the present invention comprises an organic solvent and an electrolyte salt which dissolves in the organic solvent, and the electrolyte salt contains a mixed electrolyte salt comprising a fluorine-containing inorganic anion lithium salt and a lithium imide salt.

The fluorine-containing inorganic anion lithium salt which is the first component of the electrolyte salt used in the present invention is one or more salts selected from, for example, $LiPF_6$, $LiBF_4$, $LiAsF_6$ and $LiSbF_6$.

The lithium imide salt which is the second component is one or more salts selected, for example, from the salts represented by the following formula (1):

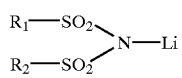
(1)

(wherein $R_1$ and $R_2$ are independent of one another and represent $C_nX_{2n+1}$ or $C_nX_{2n-1}$ in which n is an integer of from 1 to 8 and X is a hydrogen atom or a halogen atom).

Examples of the above compounds are $LiN(CF_3SO_2)_2$, $LiN(C_2F_5SO_2)_2$, $LiN(CF_3SO_2)(C_4F_9SO_2)$, and the like.

Amount of the lithium imide salt is desirably not less than 0.003 mol/l and not more than 0.50 mol/l for the reasons as mentioned above.

The total amount of the fluorine-containing inorganic anion lithium salt and the lithium imide salt is desirably not less than 0.5 mol/l and not more than 2 mols/l. If the total amount is less than 0.5 mol/l, lithium ion conductivity of the electrolyte is low, and when high rate discharge or low temperature discharge is carried out, polarization is great to deteriorate characteristics.

If the total amount is more than 2 mols/l, viscosity of the whole electrolyte increases, and as a result, lithium ion conductivity of the electrolyte is low and high rate discharge characteristics or low temperature discharge characteristics are deteriorated as in the case of less than 0.5 mol/l.

Use of $LiPF_6$ as the fluorine-containing inorganic anion lithium salt and use of $LiN(CF_3SO_2)_2$ as the lithium imide salt are especially preferred in the present invention. Since both the electrolyte salts have relatively high lithium ion conductivity, there can be provided an electrolyte which is inhibited from evolution of gases during storage and excellent in characteristics after storage with maintaining the excellent battery characteristics.

Examples of the non-aqueous solvents are cyclic carbonic acid esters such as propylene carbonate, ethylene carbonate, butylene carbonate and vinylene carbonate, non-cyclic carbonic acid esters such as dimethyl carbonate, diethyl carbonate and ethylmethyl carbonate, cyclic carboxylic acid esters or derivatives thereof such as γ-butyrolactone, γ-valerolactone and δ-valerolactone, furans or derivatives thereof such as tetrahydrofuran and 2-methyltetrahydrofuran, ethers or derivatives thereof such as 1,2-dimethoxyethane and 1,2-diethoxyethane, glymes or derivatives thereof such as diglyme, triglyme and tetraglyme, amides such as N,N-dimethylformamide and N-methylpyrrolidinone, alcohols such as ethylene glycol and propylene glycol, aliphatic carboxylic acid esters such as methyl acetate, ethyl acetate, methyl propionate and ethyl propionate, phosphoric acids or phosphoric acid esters, dimethyl sulfoxide, sulfolane or derivatives thereof, and dioxolan or derivatives thereof. One or more of them may be used. Especially, when one or more solvents selected from the group consisting of cyclic carbonic acid esters, cyclic carboxylic acid esters, non-cyclic carbonic acid esters and aliphatic carboxylic acid esters are used, good characteristics are obtained and this is preferred. The effects of the present invention can be more conspicuously exhibited when cyclic carbonic acid esters or cyclic carboxylic acid esters which readily cause ring opening reaction or non-cyclic carbonic acid esters which readily cause ester interchange reaction, such as ethylene carbonate, butylene carbonate, vinylene carbonate, γ-butyrolactone, dimethyl carbonate, diethyl carbonate and ethylmethyl carbonate are used as a part of the electrolyte.

Known compounds may be added to the electrolyte for the purpose of improving various characteristics.

Separators are not particularly limited, but porous films made of polyethylene or polypropylene can be used. Moreover, the present invention can be applied to high molecular polymeric electrolytes containing an electrolyte which are called gelled electrolytes.

The positive electrode and the negative electrodes are produced by coating on the surface of a collector a mix layer containing an active material of positive electrode or a negative electrode material capable of electrochemically and reversibly intercalating and deintercalating lithium ion, and additionally containing a conducting agent, a binder and the like.

As the active material of positive electrode, there is used a lithium-containing composite transition metal oxide or a lithium-containing composite transition metal oxide in which a metal element other than the transition metal constituting the lithium-containing composite transition metal oxide is contained in the form of solid solution. Examples of them are $LiCoO_2$, $LiNiO_2$, $LiMn_2O_4$, $LiMnO_2$ and $LiFeO_2$, and, besides, these oxides in which a part of the transition metal (Co, Ni, Mn, Fe) is replaced with other transition metals, tin (Sn), aluminum (Al), magnesium (Mg), and the like.

In the present invention, furthermore, one or more of metals of Groups IIA, IIIB, IVB, VB and VIB and lanthanide elements in the periodic table and compounds of these metals is added to the above active material of positive electrode. For example, there are added metals such as magnesium, calcium, strontium, barium, yttrium, lanthanum, titanium, zirconium, hafnium, vanadium, niobium, tantalum, chromium, molybdenum, tungsten, cerium, praseodymium, neodymium, samarium, gadolinium and ytterbium, and compounds such as oxides, hydroxides, bromides, chlorides, fluorides, sulfides, nitrates, carbonates, sulfates, phosphates, oxalates and acetates of these metals. Preferred are calcium, magnesium, yttrium, lanthanum, titanium, zirconium, vanadium, niobium, chromium, cerium and samarium, and oxides, hydroxides and carbonates of these metals.

Content of these metals or compounds thereof in terms of the metals is preferably not less than 10 ppm and not more than 500 ppm based on the active material. If the content of the metals or compounds thereof is more than 500 ppm, the active points of the positive electrode markedly increase and, hence, evolution of gases at the time of charging and storing at high temperatures cannot sufficiently be inhibited. On the other hand, if the content is less than 10 ppm, the evolution of gases can be inhibited, but characteristics such as high rate discharge characteristics or low-temperature discharge characteristics are insufficient.

The negative electrode materials are not particularly limited. Examples thereof are alkali metals, lithium ion or sodium ion, and as the host materials such as carbon materials, e.g., amorphous carbon materials, artificial graphite fired at a temperature higher than 2000° C., and natural graphite, metals capable of being alloyed with alkali metals, such as aluminum (Al), lead (Pb), tin (Sn), bismuth (Bi) and silicon (Si), intermetallic compounds of alkali metal interstitial inclusion type cubic system (AlSb, $Mg_2Si$, $NiSi_2$), lithium nitrogen compounds ($Li_{(3-x)}M_xN$ (M: transition metal), and the like. Especially preferred are carbons capable of absorbing and releasing lithium and having a spacing (d002) of lattice planes (002) of not more than 3.37 Å and a size (Lc) of crystallites in the direction of axis c of not less than 200 Å.

Irrespective of the structure of lithium secondary battery, the present invention exhibits the similar effects in batteries of various shapes, for example, coin shape, button shape, sheet shape, cylindrical shape, square shape, and other shapes.

EXAMPLES

Examples of the present invention will be explained below referring to the results shown in the tables. These examples should not be construed as limiting the invention.

Example 1

FIG. 1 is a longitudinal sectional view of a cylindrical battery used in this example. In FIG. 1, the reference numeral 1 indicates a battery case made by working a stainless steel plate having resistance to organic electrolyte, 2 indicates a sealing plate provided with a safety valve, 3 indicates an insulation packing, 4 indicates an electrode plate group, and a positive electrode plate 5 and a negative electrode plate 6 between which a separator is interposed are rolled a plurality of times into a spiral form and inserted in the battery case 1. A positive electrode lead 5a is drawn from the positive electrode plate 5 and connected to the sealing plate 2, and a negative electrode lead 6a is drawn from the negative electrode plate 6 and connected to the bottom of the battery case 1. The reference numeral 7 indicates an insulation ring, which is provided at the upper and lower portions of the electrode plate group 4. The positive electrode, the negative electrode, and others will be explained in detail below.

The positive electrode material was prepared in the following manner. $Li_2CO_3$ and $Co_3O_4$ were mixed and fired at 900° C. for 10 hours to prepare an $LiCoO_2$ powder. This powder was mixed with a given amount of a metal compound, CaO or $Cr_2O_3$. One hundred parts by weight of the mixture was mixed with 3 parts by weight of acetylene black and 7 parts by weight of a fluorocarbon resin binder, followed by suspending the mixture in an aqueous carboxymethyl cellulose solution to prepare a paste, which was used as the positive electrode material. The resulting paste was coated on both sides of an aluminum foil of 0.03 mm in thickness and dried, followed by rolling the aluminum foil to make a positive electrode plate 5 of 0.18 mm in thickness.

A negative electrode material was prepared by mixing 100 parts by weight of an artificial graphite powder with 5 parts by weight of styrene-butadiene rubber and suspending the mixture in an aqueous carboxymethyl cellulose solution to prepare a paste, which was used as the negative electrode material. This paste was coated on both sides of a copper foil of 0.02 mm in thickness and dried, followed by rolling the copper foil to make a negative electrode plate 6 of 0.19 mm in thickness.

A lead made of aluminum was attached to the positive electrode plate 5 and a lead made of nickel was attached to the negative electrode plate 6, and the positive electrode plate and the negative electrode plate with a polyethylene porous film of 0.025 mm in thickness interposed between the positive electrode plate and the negative electrode plate were rolled into a spiral form and inserted in a battery case of 18.0 mm in diameter and 65.0 mm in height.

The electrolyte used was prepared by dissolving an electrolyte salt shown in Table 1 in a mixed solvent comprising ethylene carbonate and ethylmethyl carbonate at a volume ratio of 1:3. This electrolyte was poured into the battery case, and then the case was sealed to make a battery. Specifications of the battery were nominal voltage: 3.6 V and nominal capacity: 1600 mAh.

Constant current charging of the resulting battery was carried out at a charging current of 320 mA until the voltage reached 4.1 V. Then, discharging was carried out at a constant current of 320 mA until the voltage reached 3.0 V. 3 cycles of the charging and discharging were repeated, and the difference between the total of charge capacities and that of discharge capacity at the charge and discharge test which carried out 3 cycles of the charging and discharging was taken as a retention at the finish charging and discharging.

Batteries were made with changing the component of the positive electrode and the component of the electrolyte salt in the electrolyte as shown in Table 1, and these batteries were referred to as batteries A1 to A16.

TABLE 1

| | Metal Compound Added | Composition of Solvent | Electrolyte salt |
|---|---|---|---|
| Battery A1 | Not added | EC/EMC = 1/3 | 1.0 M $LiPF_6$ |
| Battery A2 | Not added | EC/EMC = 1/3 | 1.0 M $LiPF_6$ + 0.048 M $LiN(CF_3SO_2)_2$ |
| Battery A3 | CaO 1000 ppm | EC/EMC = 1/3 | 1.0 M $LiPF_6$ |
| Battery A4 | CaO 1000 ppm | EC/EMC = 1/3 | 1.0 M $LiPF_6$ + 0.048 M $LiN(CF_3SO_2)_2$ |
| Battery A5 | CaO 500 ppm | EC/EMC = 1/3 | 1.0 M $LiPF_6$ |
| Battery A6 | CaO 500 ppm | EC/EMC = 1/3 | 1.0 M $LiPF_6$ + 0.048 M $LiN(CF_3SO_2)_2$ |
| Battery A7 | CaO 200 ppm | EC/EMC = 1/3 | 1.0 M $LiPF_6$ |
| Battery A8 | CaO 200 ppm | EC/EMC = 1/3 | 1.0 M $LiPF_6$ + 0.048 M $LiN(CF_3SO_2)_2$ |
| Battery A9 | CaO 30 ppm | EC/EMC = 1/3 | 1.0 M $LiPF_6$ |
| Battery A10 | CaO 30 ppm | EC/EMC = 1/3 | 1.0 M $LiPF_6$ + 0.048 M $LiN(CF_3SO_2)_2$ |
| Battery A11 | CaO 10 ppm | EC/EMC = 1/3 | 1.0 M $LiPF_6$ |
| Battery A12 | CaO 10 ppm | EC/EMC = 1/3 | 1.0 M $LiPF_6$ + 0.048 M $LiN(CF_3SO_2)_2$ |
| Battery A13 | $Cr_2O_3$ 30 ppm | EC/EMC = 1/3 | 1.0 M $LiPF_6$ |
| Battery A14 | $Cr_2O_3$ 30 ppm | EC/EMC = 1/3 | 1.0 M $LiPF_6$ + 0.048 M $LiN(CF_3SO_2)_2$ |
| Battery A15 | $Cr_2O_3$ 10 ppm | EC/EMC = 1/3 | 1.0 M $LiPF_6$ |
| Battery A16 | $Cr_2O_3$ 10 ppm | EC/EMC = 1/3 | 1.0 M $LiPF_6$ + 0.048 M $LiN(CF_3SO_2)_2$ |

These batteries A1 to A16 were subjected to high-temperature charging storage test. The charging was conducted according to the constant current and constant voltage charging method, and a constant current charging at a charging current of 1120 mA was carried out until the voltage reached 4.2 V, and after reaching 4.2 V, a constant voltage charging at 4.2 V was carried out. The charging time was 2.5 hours in total. Discharging was carried out at a discharging current of 320 mA (0.2 C). These charging and discharging of 3 cycles were repeated, and the discharge capacity after the third cycle was measured. Thereafter, the batteries were kept at charged state, and left to stand for 20 days at an environmental temperature of 60° C. Then, a part of the test batteries were put in bags made of Teflon and the bags were filled with a known amount of argon gas and closed, and a hole was made at the upper portion of the battery in the bag to release the gas in the battery. Amount of the gas was obtained from the peak area ratio of gas chromatography. The other test batteries were subjected to charging and discharging of 3 cycles under the same charging and discharging conditions as above, and discharge capacity after the third cycle was measured. The test results are shown in Table 2.

TABLE 2

| | Discharge capacity before storing at 60° C. for 20 days/mAh | Discharge capacity after storing at 60° C. for 20 days/mAh | Recovery rate before and after storing/% | Amount of gas after storing at 60° C. for 20 days/ml |
|---|---|---|---|---|
| Battery A1 | 1600 | 1421 | 88.8 | 9.2 |
| Battery A2 | 1600 | 1463 | 91.4 | 3.2 |
| Battery A3 | 1600 | 1455 | 90.9 | 22.8 |
| Battery A4 | 1600 | 1473 | 92.1 | 14.7 |
| Battery A5 | 1600 | 1496 | 93.5 | 14.8 |
| Battery A6 | 1600 | 1573 | 98.3 | 6.5 |
| Battery A7 | 1600 | 1490 | 93.1 | 13.2 |
| Battery A8 | 1600 | 1565 | 97.8 | 6.0 |
| Battery A9 | 1600 | 1464 | 91.5 | 10.7 |
| Battery A10 | 1600 | 1561 | 97.6 | 4.3 |
| Battery A11 | 1600 | 1455 | 90.9 | 10.2 |
| Battery A12 | 1600 | 1556 | 97.3 | 4.0 |
| Battery A13 | 1600 | 1454 | 90.9 | 11.3 |
| Battery A14 | 1600 | 1555 | 97.2 | 5.1 |
| Battery A15 | 1600 | 1445 | 90.3 | 10.9 |
| Battery A16 | 1600 | 1549 | 96.8 | 4.8 |

As can be seen from the test results of Table 2, the batteries A3, A5, A7, A9, A11, A13 and A15 in which the metal compounds were added to the positive electrode were better in discharge characteristics after storing, but larger in the amount of the evolved gas than the battery A1 in which the metal compound was not added to the positive electrode. This is because the metal compound together with the active material of positive electrode formed an active site for the evolution of gas on the positive electrode. On the other hand, it was seen that the batteries A2, A6, A8, A10, A12, A14 and A16 which contained lithium imide salts were less in the amount of the evolved gas after charging and storing and better in battery characteristics after storing. However, when amount of CaO added was large as in the battery A4, evolution of gas could not be sufficiently inhibited even if the lithium imide salt was added. Therefore, amount of the metal compound is preferably not more than 500 ppm. Especially, it was recognized that when positive electrodes which give good battery characteristics, but readily evolve the gas were used as in the batteries A6, A8, A10, A12, A14 and A16, the gas evolution was very effectively inhibited by adding the lithium imide salts.

Example 2

Next, investigation was made on the case where concentration of the electrolyte salt was changed. The electrolyte was prepared by adding the electrolyte salts shown in Table 3 to a mixed solvent comprising ethylene carbonate and ethylmethyl carbonate at a volume ratio of 1:3. A mixture of $LiCoO_2$ powder with 30 ppm of CaO was used for the positive electrode. Batteries were made in the same manner as in Example 1, except for the above points, and these batteries were referred to as batteries B1 to B13.

TABLE 3

| | Concentration of the first component $LiPF_6$ | Concentration of the second component $LiN(CF_3SO_2)_2$ |
|---|---|---|
| Battery B1 | 1.0 M | 0 M |
| Battery B2 | 1.0 M | 0.003 M |
| Battery B3 | 1.0 M | 0.02 M |
| Battery B4 | 1.0 M | 0.048 M |
| Battery B5 | 1.0 M | 0.1 M |
| Battery B6 | 1.0 M | 0.25 M |
| Battery B7 | 1.0 M | 0.5 M |
| Battery B8 | 0.75 M | 0.75 M |
| Battery B9 | 0.3 M | 0.048 M |
| Battery B10 | 0.5 M | 0.048 M |
| Battery B11 | 1.2 M | 0.048 M |

TABLE 3-continued

|  | Concentration of the first component LiPF$_6$ | Concentration of the second component LiN (CF$_3$SO$_2$)$_2$ |
|---|---|---|
| Battery B12 | 1.9 M | 0.048 M |
| Battery B13 | 2.2 M | 0.048 M |

These batteries B1 to B13 were subjected to high-temperature charging storage test. The test conditions were the same as in Example 1. The results of the storage test and the retention at the finish charging and discharging are shown in Table 4.

TABLE 4

|  | Discharge capacity before storing at 60° C. for 20 days/mAh | Discharge capacity after storing at 60° C. for 20 days/mAh | Recovery rate before and after storing/% | Amount of gas after storing at 60° C. for 20 days/ml | Retention at finishing/mAh |
|---|---|---|---|---|---|
| Battery B1 | 1600 | 1464 | 91.5 | 10.7 | 102 |
| Battery B2 | 1600 | 1474 | 92.1 | 6.0 | 105 |
| Battery B3 | 1600 | 1550 | 96.9 | 4.8 | 110 |
| Battery B4 | 1600 | 1561 | 97.6 | 4.3 | 119 |
| Battery B5 | 1600 | 1571 | 98.2 | 4.1 | 143 |
| Battery B6 | 1593 | 1568 | 98.4 | 4.5 | 178 |
| Battery B7 | 1587 | 1541 | 97.1 | 5.8 | 215 |
| Battery B8 | 1572 | 1435 | 91.3 | 10.2 | 302 |
| Battery B9 | 1510 | 1027 | 68.0 | 5.3 | 321 |
| Battery B10 | 1580 | 1438 | 91.0 | 4.9 | 122 |
| Battery B11 | 1600 | 1579 | 98.7 | 4.7 | 116 |
| Battery B12 | 1591 | 1433 | 90.1 | 6.3 | 121 |
| Battery B13 | 1532 | 1035 | 67.6 | 7.9 | 318 |

As can be seen from the test results on batteries B1 to B7 in Table 4, the batteries B2 to B7 to which the second component LiN(CF$_3$SO$_2$)$_2$ was added were less in the amount of evolved gas after charging and storing and better in characteristics after storing than the battery B1 to which the second component was not added. On the other hand, the battery B8 to which a further larger amount of LiN (CF$_3$SO$_2$)$_2$ was added was larger in the amount of the evolved gas after charging and storing and was inferior in characteristics after storing. With increase of the amount of LiN(CF$_3$SO$_2$)$_2$, charging loss caused by formation of film at the finish charging and discharging was great and retention increased. From the above, the amount of the second component LiN(CF$_3$SO$_2$)$_2$ is preferably not less than 0.003 mol/l and not more than 0.50 mol/l, more preferably not less than 0.003 mol/l and not more than 0.25 mol/l, and most preferably not less than 0.003 mol/l and not more than 0.05 mol/l.

As can be seen from the test results on batteries B9 to B13 shown in Table 4, the batteries B9 and B13 were inferior in discharge characteristics before charging and storing. Furthermore, they were low in recovery rate after storing. From the above results, the total concentration of the electrolyte salts is optimally not less than 0.5 mol/l and not more than 2 mols/l.

When batteries B2 to B7 which were superior in battery characteristics on the whole were compared with battery B1 which used only the conventional LiPF$_6$, it can be seen that there was not much difference in discharge characteristics before charging and storing while the batteries B2 to B7 were improved than the battery B1 in discharge characteristics and evolution of gas after charging and storing. From the above, the non-aqueous electrolyte of the present invention has the effects of inhibiting the gas evolution during storing at high temperatures and exhibiting excellent discharge characteristics even after storing.

Example 3

Next, investigation was made on the case where the components of the electrolyte salts were changed. As shown in Table 5, the components of the electrolyte salts in the electrolyte were changed. A mixture of LiCoO$_2$ powder with 30 ppm of CaO was used for the positive electrode. Batteries were made in the same manner as in Example 1, except for the above points, and these batteries were referred to as batteries C1 to C5 and batteries D1 to D7.

TABLE 5

|  | Electrolyte salt |
|---|---|
| Battery C1 | 1.0 M LiPF$_6$ |
| Battery C2 | 1.0 M LiPF$_6$ + 0.048 M LiN (C$_2$F$_5$SO$_2$)$_2$ |
| Battery C3 | 1.0 M LiPF$_6$ + 0.25 M LiN (C$_2$F$_5$SO$_2$)$_2$ |
| Battery C4 | 1.0 M LiPF$_6$ + 0.048 M LiN (CF$_3$SO$_2$) (C$_4$F$_9$SO$_2$) |
| Battery C5 | 1.0 M LiPF$_6$ + 0.25 M LiN (CF$_3$SO$_2$) (C$_4$F$_9$SO$_2$) |
| Battery D1 | 1.0 M LiBF$_4$ |
| Battery D2 | 1.0 M LiBF$_4$ + 0.048 M LiN (CF$_3$SO$_2$)$_2$ |
| Battery D3 | 1.0 M LiBF$_4$ + 0.25 M LiN (CF$_3$SO$_2$)$_2$ |
| Battery D4 | 1.0 M LiBF$_4$ + 0.048 M LiN (C$_2$F$_5$SO$_2$)$_2$ |
| Battery D5 | 1.0 M LiBF$_4$ + 0.25 M LiN (C$_2$F$_5$SO$_2$)$_2$ |
| Battery D6 | 1.0 M LiBF$_4$ + 0.048 M LiN (CF$_3$SO$_2$) (C$_4$F$_9$SO$_2$) |
| Battery D7 | 1.0 M LiBF$_4$ + 0.25 M LiN (CF$_3$SO$_2$) (C$_4$F$_9$SO$_2$) |

The batteries of Table 5 were subjected to high-temperature charging storage test. The test conditions were the same as in Example 1. The test results are shown in Table 6.

TABLE 6

|  | Discharge capacity before storing at 60° C. for 20 days/mAh | Discharge capacity after storing at 60° C. for 20 days/mAh | Recovery rate before and after storing/% | Amount of gas after storing at 60° C. for 20 days/ml |
|---|---|---|---|---|
| Battery C1 | 1600 | 1464 | 91.5 | 10.7 |
| Battery C2 | 1600 | 1555 | 97.2 | 4.4 |
| Battery C3 | 1595 | 1563 | 98.0 | 4.6 |
| Battery C4 | 1600 | 1552 | 97.0 | 4.2 |
| Battery C5 | 1592 | 1557 | 97.8 | 4.5 |
| Battery D1 | 1564 | 1311 | 83.8 | 12.8 |
| Battery D2 | 1570 | 1418 | 90.3 | 5.0 |
| Battery D3 | 1592 | 1482 | 93.1 | 5.4 |
| Battery D4 | 1565 | 1410 | 90.1 | 5.2 |
| Battery D5 | 1587 | 1473 | 92.8 | 5.7 |
| Battery D6 | 1568 | 1417 | 90.4 | 4.9 |
| Battery D7 | 1589 | 1475 | 92.8 | 5.5 |

It can be seen from Table 6 that all the batteries C2 to C5 were not much different from C1 in discharge characteristics before charging and storing while they were improved than battery C1 in discharge characteristics and evolution of gas after charging and storing. It can be seen from the results that even the lithium imide salts other than LiN(CF$_3$SO$_2$)$_2$ have the similar effects.

Furthermore, as for the batteries D1 to D7, the batteries containing the lithium imide salts (the batteries D2 to D7) were less in the amount of the evolved gas after high-temperature charging and storing and improved in characteristics after storing than the battery D1 containing no lithium imide salt. It can be seen from the above results that the similar effects were also exhibited when fluorine-containing inorganic anion lithium salts other than $LiPF_6$ were used as the first electrolyte.

Example 4

Next, investigation was made on the case where the solvent was changed. As the solvent, one which was prepared by mixing γ-butyrolactone, ethylene carbonate and vinylene carbonate at a volume ratio of 18:2:1 was used, and the components of the electrolyte salts in the electrolyte were changed as shown in Table 7 and Table 8 A mixture of $LiCoO_2$ powder with 30 ppm of CaO was used for the positive electrode. Batteries were made in the same manner as in Example 1, except for the above points, and these batteries were referred to as batteries E1 to E13, batteries F1 to F5, and batteries G1 to G7.

TABLE 7

| | Concentration of the first component $LiPF_6$ | Concentration of the second component $LiN(CF_3SO_2)_2$ |
|---|---|---|
| Battery E1 | 1.0 M | 0 M |
| Battery E2 | 1.0 M | 0.003 M |
| Battery E3 | 1.0 M | 0.02 M |
| Battery E4 | 1.0 M | 0.048 M |
| Battery E5 | 1.0 M | 1.0 M |
| Battery E6 | 1.0 M | 0.25 M |
| Battery E7 | 1.0 M | 0.5 M |
| Battery E8 | 0.75 M | 0.75 M |
| Battery E9 | 0.3 M | 0.048 M |
| Battery E10 | 0.5 M | 0.048 M |
| Battery E11 | 1.2 M | 0.048 M |
| Battery E12 | 1.9 M | 0.048 M |
| Battery E13 | 2.2 M | 0.048 M |

TABLE 8

| | Electrolyte salt |
|---|---|
| Battery F1 | 1.0 M $LiPF_6$ |
| Battery F2 | 1.0 M $LiPF_6$ + 0.048 M $LiN(C_2F_5SO_2)_2$ |
| Battery F3 | 1.0 M $LiPF_6$ + 0.25 M $LiN(C_2F_5SO_2)_2$ |
| Battery F4 | 1.0 M $LiPF_6$ + 0.048 M $LiN(CF_3SO_2)(C_4F_9SO_2)$ |
| Battery F5 | 1.0 M $LiPF_6$ + 0.25 M $LiN(CF_3SO_2)(C_4F_9SO_2)$ |
| Battery G1 | 1.0 M $LiBF_4$ |
| Battery G2 | 1.0 M $LiBF_4$ + 0.048 M $LiN(CF_3SO_2)_2$ |
| Battery G3 | 1.0 M $LiBF_4$ + 0.25 M $LiN(CF_3SO_2)_2$ |
| Battery G4 | 1.0 M $LiBF_4$ + 0.048 M $LiN(C_2F_5SO_2)_2$ |
| Battery G5 | 1.0 M $LiBF_4$ + 0.25 M $LiN(C_2F_5SO_2)_2$ |
| Battery D6 | 1.0 M $LiBF_4$ + 0.048 M $LiN(CF_3SO_2)(C_4F_9SO_2)$ |
| Battery G7 | 1.0 M $LiBF_4$ + 0.25 M $LiN(CF_3SO_2)(C_4F_9SO_2)$ |

The batteries of Table 7 and Table 8 were subjected to high-temperature charging storage test. The test conditions were the same as in Example 1. The test results are shown in Table 9 and Table 10.

TABLE 9

| | Discharge capacity before storing at 60° C. for 20 days/mAh | Discharge capacity after storing at 60° C. for 20 days/mAh | Recovery rate before and after storing/% | Amount of gas after storing at 60° C. for 20 days/ml | Retention at finishing/mAh |
|---|---|---|---|---|---|
| Battery E1 | 1600 | 1416 | 88.5 | 11.0 | 104 |
| Battery E2 | 1600 | 1438 | 89.9 | 6.6 | 106 |

TABLE 9-continued

| | Discharge capacity before storing at 60° C. for 20 days/mAh | Discharge capacity after storing at 60° C. for 20 days/mAh | Recovery rate before and after storing/% | Amount of gas after storing at 60° C. for 20 days/ml | Retention at finishing/mAh |
|---|---|---|---|---|---|
| Battery E3 | 1600 | 1480 | 92.5 | 5.2 | 111 |
| Battery E4 | 1600 | 1491 | 93.2 | 4.7 | 121 |
| Battery E5 | 1600 | 1507 | 94.2 | 4.3 | 142 |
| Battery E6 | 1591 | 1508 | 94.8 | 5.0 | 175 |
| Battery E7 | 1585 | 1479 | 93.3 | 6.2 | 212 |
| Battery E8 | 1560 | 1382 | 88.6 | 10.9 | 301 |
| Battery E9 | 1505 | 981 | 65.2 | 6.1 | 319 |
| Battery E10 | 1579 | 1407 | 89.1 | 5.4 | 123 |
| Battery E11 | 1600 | 1523 | 95.2 | 5.1 | 114 |
| Battery E12 | 1587 | 1416 | 89.2 | 6.8 | 125 |
| Battery E13 | 1525 | 1011 | 66.3 | 8.5 | 317 |

TABLE 10

| | Discharge capacity before storing at 60° C. for 20 days/mAh | Discharge capacity after storing at 60° C. for 20 days/mAh | Recovery rate before and after storing/% | Amount of gas after storing at 60° C. for 20 days/ml |
|---|---|---|---|---|
| Battery F1 | 1600 | 1416 | 88.5 | 11.0 |
| Battery F2 | 1590 | 1479 | 93.0 | 4.9 |
| Battery F3 | 1600 | 1509 | 94.3 | 5.2 |
| Battery F4 | 1588 | 1478 | 93.1 | 4.7 |
| Battery F5 | 1600 | 1512 | 94.5 | 5.1 |
| Battery G1 | 1555 | 1277 | 82.1 | 13.5 |
| Battery G2 | 1561 | 1397 | 89.5 | 5.3 |
| Battery G3 | 1588 | 1463 | 92.1 | 5.7 |
| Battery G4 | 1558 | 1391 | 89.3 | 5.5 |
| Battery G5 | 1585 | 1455 | 91.8 | 5.9 |
| Battery G6 | 1560 | 1398 | 89.6 | 5.2 |
| Battery G7 | 1586 | 1459 | 92.0 | 5.7 |

As can be seen from the test results of Table 9, the battery E1 was large in the evolved gas after charging and storing and was inferior in discharge characteristics. This is because the second component $LiN(CF_3SO_2)_2$ was not added. Since the second component $LiN(CF_3SO_2)_2$ was sufficiently present in the batteries E2 to E7, the amount of the evolved gas after charging and storing was small, and, moreover, characteristics after storing were good. The battery E8 in which $LiN(CF_3SO_2)_2$ was added in a further larger amount was large in the amount of the gas after charging and storing and inferior in characteristics after storing. With increase of the amount of $LiN(CF_3SO_2)_2$, charging loss caused by formation of a film at the finish charging and discharging was great and the retention increased. From the above, when a mixed solvent comprising γ-butyrolactone, ethylene carbonate and vinylene carbonate is used, the amount of the second component $LiN(CF_3SO_2)_2$ is also preferably not less than 0.003 mol/l and not more than 0.50 mol/l, more preferably not less than 0.003 mol/l and not more than 0.25 mol/l, and most preferably not less than 0.003 mol/l and not more than 0.05 mol/l.

The optimum concentration of the whole electrolyte salts was examined as for the batteries E9 to E13. The batteries E9 and E13 were inferior in discharge characteristics after charging and storing. Moreover, recovery rate after storing was also low. From the above results, the total concentration of the whole electrolyte salts is optimally not less than 0.5 mol/l and not more than 2 mols/l.

It can be seen from the results of Table 10 that the batteries F2 to F5 were all improved than the battery F1 in discharge characteristics after charging and storing and gas evolution. From these results, it can be seen that lithium imide salts other than $LiN(CF_3SO_2)_2$ have the similar effects.

Furthermore, as to the batteries G1 to G7, the batteries containing the lithium imide salts (batteries G2 to G7) were less in the amount of evolved gases after high-temperature storing and improved in characteristics after storing as compared with the battery G1 containing no lithium imide salts. It can be seen therefrom that the similar effects were also obtained when fluorine-containing inorganic anion lithium salts other than $LiPF_6$ were used as the first electrolyte. From the above results, it is clear that the present invention shows the similar effects even when the solvents are changed.

INDUSTRIAL APPLICABILITY

As is clear from the above explanation, in order to improve battery characteristics, the present invention uses a mixed electrolyte salt comprising a fluorine-containing inorganic anion lithium salt and a lithium imide salt when one or more of metals of Groups IIA, IIIB, IVB, VB and VIB and lanthanide elements in the periodic table and compounds of these metals are contained in the active material of positive electrode. Thus, there can be obtained lithium batteries which are inhibited from evolution of gases caused by charging, discharging and storing at high temperatures and improved in discharge characteristics after storing at high temperatures.

What is claimed is:

1. A lithium secondary battery comprising:
a positive electrode containing as an active material a lithium-containing composite transition metal oxide or a lithium-containing composite transition metal oxide in which a metal element other than the transition metal constituting the lithium-containing composite transition metal oxide is contained in the form of solid solution, said positive electrode further comprising one or more of metals of Groups IIA, IIIB, IVB, VB and VIB and lanthanide elements in the periodic table and compounds of these metals;
a negative electrode; and
a non-aqueous electrolyte containing a solvent and an electrolyte salt containing at least one salt selected from the group of fluorine-containing inorganic anion lithium salts comprising $LiPF_6$, $LiBF_4$, $LiAsF_6$ and $LiSbF_6$ and at least one salt selected from lithium imide salts represented by the following formula (1):

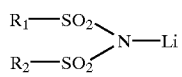

(1)

(wherein $R_1$ and $R_2$ are independent of one another and represent $C_nX_{2n+1}$ or $C_nX_{2n-1}$ in which n is an integer of 1 to 8 and X is a hydrogen atom or a halogen atom) and the one or more metals and compounds thereof is not less than 10 ppm and not more than 500 ppm based on the active material.

2. A lithium secondary battery according to claim 1, wherein the concentration of the lithium imide salt in the non-aqueous electrolyte is not less than 0.003 mol/l and not more than 0.50 mol/l.

3. A lithium secondary battery according to claim 1, the concentration of the lithium imide salt in the non-aqueous electrolyte is not less than 0.003 mol/l and not more than 0.25 mol/l.

4. A lithium secondary battery according to any one of claims 1–3, wherein the fluorine-containing inorganic anion lithium salt is $LiPF_6$ and the lithium imide salt is $LiN(CF_3SO_2)_2$.

5. A lithium secondary battery according to any one of claims 1–3, wherein the negative electrode is mainly composed of a carbon capable of absorbing and releasing lithium and having a spacing (d002) of lattice planes (002) of not more than 3.37 Å and a size (Lc) of crystallites in the direction of axis c of not less than 200 Å.

6. A lithium secondary battery according to any one of claims 1–3, wherein the solvent contains at least a cyclic carbonic acid ester, a cyclic carboxylic acid ester, a non-cyclic carbonic acid ester or an aliphatic carboxylic acid ester.

7. A lithium secondary battery according to any one of claims 1–3, wherein the total concentration of the electrolyte salts in the non-aqueous electrolyte is not less than 0.5 mol/l and not more than 2 mols/l, and the solvent contains at least ethylene carbonate, butylene carbonate, vinylene carbonate or γ-butyrolactone.

8. A lithium secondary battery according to any one of claims 1–3, wherein the total concentration of the electrolyte salts in the non-aqueous electrolyte is not less than 0.5 mol/l and not more than 2 mols/l, and the solvent contains at least ethylmethyl carbonate, diethyl carbonate or dimethyl carbonate.

9. A lithium secondary battery according to any one of claims 1–3, wherein the active material of the positive electrode contains at least one member selected from the group consisting of metals of calcium, magnesium, yttrium, lanthanum, titanium, zirconium, vanadium, niobium, chromium, cerium and samarium and compounds thereof.

10. A lithium secondary battery according to to any one of claims 1–3, wherein the active material of the positive electrode contains at least one member selected from the group consisting of metals of calcium, magnesium, yttrium, lanthanum, titanium, zirconium, vanadium, niobium, chromium, cerium and samarium and compounds thereof, and the total content thereof in terms of the metals is not less than 10 ppm and not more than 500 ppm based on the active material.

* * * * *